United States Patent
Neudecker

[11] 3,712,722
[45] Jan. 23, 1973

[54] MOTION PICTURE PROJECTOR WITH CARRIAGE FOR SETS OF FILM-CONTAINING CASSETTES

[75] Inventor: Karl Neudecker, Munich, Germany

[73] Assignee: AGFA-Gevaert Aktiengesellschaft, Leverkusen, Germany

[22] Filed: March 15, 1971

[21] Appl. No.: 124,346

[30] Foreign Application Priority Data

March 24, 1970 Germany.....................P 20 13 969.9

[52] U.S. Cl..................................................352/123
[51] Int. Cl.................................................G03b 21/04
[58] Field of Search ................352/72, 123; 242/71.1

[56] References Cited

UNITED STATES PATENTS

| | | | |
|---|---|---|---|
| 3,550,879 | 12/1970 | Bundschuh | 352/123 X |
| 3,584,879 | 6/1971 | Ban | 352/123 X |
| 3,480,354 | 11/1969 | Fukuda | 352/123 |
| 3,342,541 | 9/1967 | Mouissie et al. | 352/123 |
| 2,755,030 | 7/1956 | D'Ornellas | 352/123 X |

Primary Examiner—Joseph F. Peters, Jr.
Attorney—Michael S. Striker

[57] ABSTRACT

A motion picture projector wherein a reciprocable carriage supports a set of abutting cassettes for motion picture film which is stored therein on supply reels and can be withdrawn through openings in bottom walls of the respective cassettes. The cassettes are insertable directly into the carriage or into a magazine which is removably inserted into the carriage. Each cassette has limited freedom of movement with reference to the carriage. The carriage is movable between several positions in each of which a different cassette occupies a projection position in which the parts of a film threading or withdrawing mechanism can enter the opening of such cassette from below in order to withdraw the leader of convoluted film and to move the leader into the range of a film transporting mechanism. A lever which is pivotable by the advancing mechanism for the carriage enters the opening of the cassette which occupies the projection position to insure that such opening assumes an optimum position with reference to the film withdrawing mechanism, irrespective of eventual deviations of the dimensions of cassettes from a desired dimension. The cassettes are movable with reference to the carriage against the opposition of springs which yield when the lever enters into the opening of a cassette in the projection position to thereby cause a movement of the opening of such cassette into exact registry with the film withdrawing mechanism.

16 Claims, 2 Drawing Figures

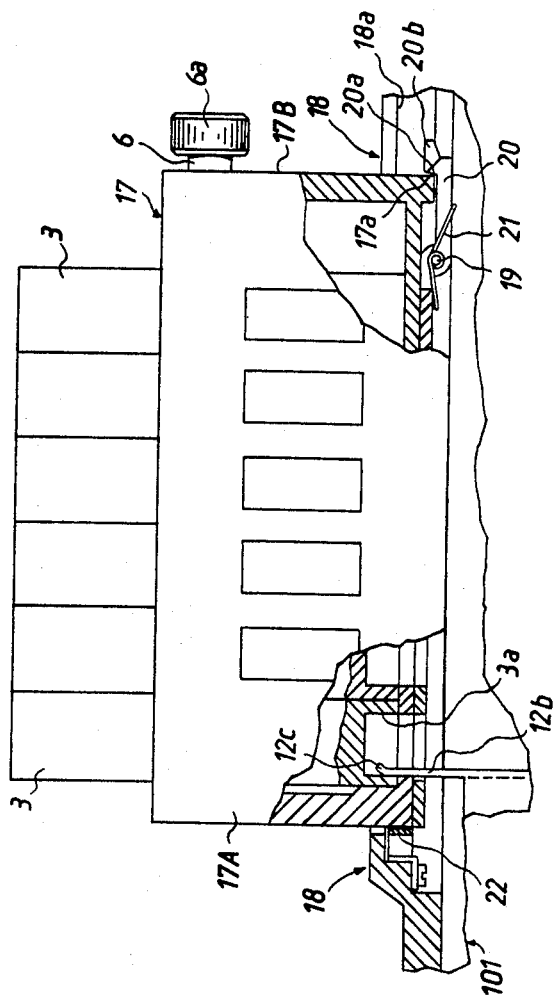

MOTION PICTURE PROJECTOR WITH CARRIAGE FOR SETS OF FILM-CONTAINING CASSETTES

BACKGROUND OF THE INVENTION

The present invention relates to cinematographic apparatus in general, and more particularly to improvements in motion picture projectors which are used with film-containing cassettes or analogous containers. Still more particularly, the invention relates to improvements in means for moving cassettes which contain supply reels for motion picture film with reference to the housing of a motion picture projector.

It is already known to provide a motion picture projector with means for storing a set of film-containing cassettes and with means for moving the cassettes with reference to the housing of the projector so that a selected cassette assumes a projection position, namely, that position in which the film which is convoluted on its supply reel can be withdrawn for projection of its images onto a screen and is thereupon rewound onto the supply reel prior to placing of another cassette into the projection position. A drawback of presently known projectors is that the cassettes often fail to assume an optimum projection position in which a film threading mechanism is capable of withdrawing the film and of advancing it along a predetermined path for attachment of the leader to a takeup reel. This is due to the fact that the cassettes are normally stacked without interposition of any partitions and, therefore, if the dimensions (particularly the width) of a single cassette deviate from desired or predetermined dimensions, at least some of the cassettes are likely to be out of exact alignment with the film threading mechanism even though they appear to occupy the desired projection position. As a rule, the bottom walls of cassettes are provided with suitable openings which permit entry of parts of an automatic film threading mechanism serving to advance the leader of convoluted film into the range of a driven sprocket preparatory to transport of the leader into engagement with the core of the takeup reel. The parts of the film threading mechanism are likely to be damaged or the mechanism is incapable of entering a cassette if the latter does not occupy an accurately determined projection position. The situation is aggravated if the projector supports a set consisting of a substantial number of cassettes each of which is either wider or narrower than an ideal cassette. Such situation is likely to arise when the cassettes are mass-produced from synthetic plastic material.

SUMMARY OF THE INVENTION

An object of the invention is to provide a motion picture projector with novel and improved means for insuring accurate alignment of selected cassettes with the film threading mechanism, irrespective of eventual deviations of dimensions of such cassettes from optimum dimensions.

Another object of the invention is to provide a motion picture projector with novel means for supporting and transporting sets of cassettes and with novel means for insuring proper positioning of selected cassettes during the projection of images of film which is being withdrawn from such selected cassettes.

A further object of the invention is to provide a motion picture projector with a novel carriage for sets of film-containing cassettes.

An additional object of the invention is to provide a motion picture projector which can maintain each of a substantial number of cassettes in an optimum position during projection of images even if the dimensions of each cassette deviate from desired dimensions.

Still another object of the invention is to provide a motion picture projector which employs film-containing cassettes with means for preventing damage to its film threading or withdrawing mechanism.

The invention is embodied in a motion picture projector which comprises a housing or an analogous support, a carriage which is movably (preferably reciprocably) mounted on the support, a set of cassettes received in the carriage with limited freedom of movement with reference to the carriage, each cassette containing a supply of convoluted motion picture film (e.g., 8-millimeter film) and having an opening for withdrawal of film from the respective supply, advancing or indexing means for moving the carriage with reference to the support between a plurality of positions in each of which a different cassette of the set occupies a projection position, film withdrawing or threading means mounted in or on the support and operable to withdraw film from the cassette which occupies the projection position, and aligning means which is mounted in or on the support and is movable between an inoperative position in which the carriage is free to move with the cassettes relative to the support in response to actuation of the advancing means and an operative position of engagement with the cassette occupying the projection position to thus maintain the opening of such cassette in a predetermined position with reference to the withdrawing means.

Thus, even if the projection position of a cassette does not exactly correspond to a desired position in which the opening of such cassette is in an optimum position with reference to the withdrawing means when the transport of the carriage to a new position is completed, the aligning means insures that the opening of the cassette occupying the projection position assumes the predetermined position to avoid damage to the film, to the withdrawing means, and/or to other parts of the projector.

The novel features which are considered as characteristic of the invention are set forth in particular in the appended claims.

The improved motion picture projector itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is a similar fragmentary front elevational view of a second projector wherein the cassettes are stored in a magazine which is insertable into an indexible carriage.

DESCRIPTION OF THE PREFERRED EMBODIMENTS

Figure 1:
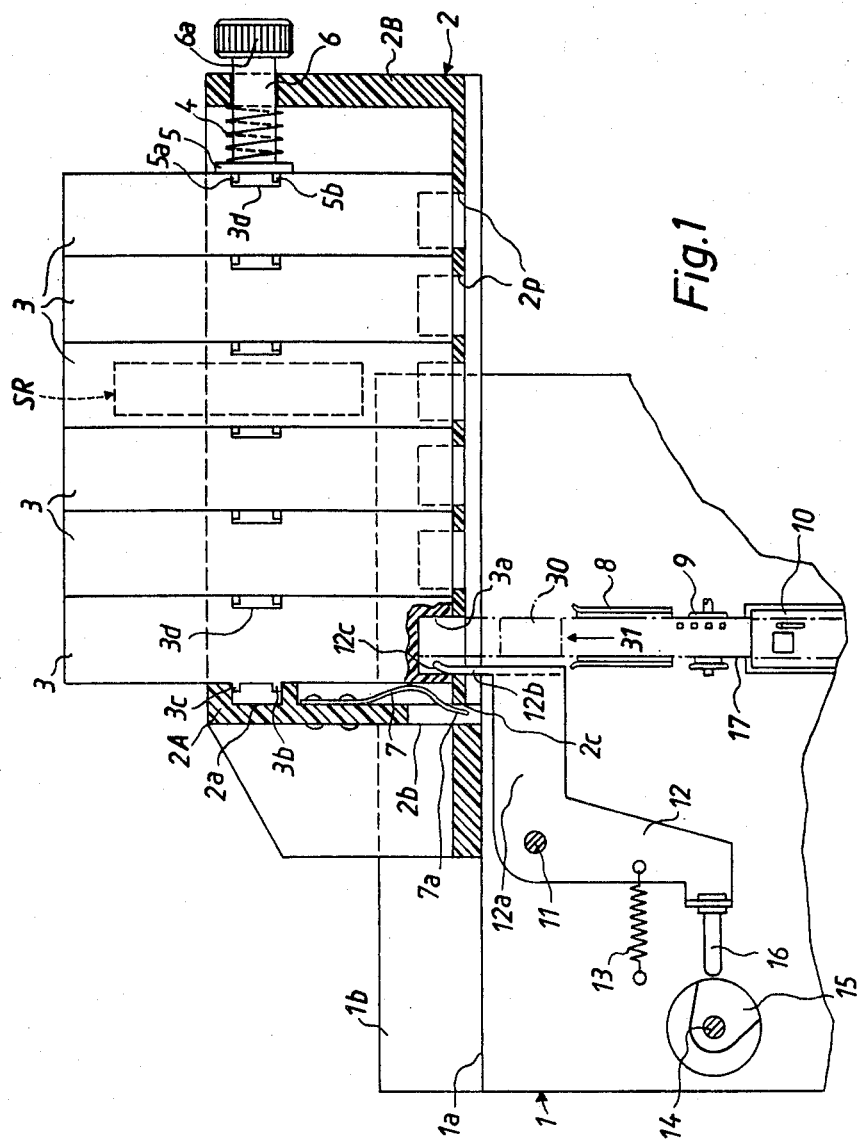
FIG. 1 is a fragmentary schematic front elevational view of a motion picture projector with an indexible carriage which is shown in section and serves for reception of a set of cassettes.

Referring first to FIG. 1, there is shown a motion picture projector having a housing or main support 1 including a top wall 1b which is provided with a guide channel 1a extending at right angles to the optical axis of the projection lens, not shown. The channel 1a serves to guide a reciprocable frame or carriage 2 which accommodates a set of abutting containers or cassettes 3 for motion picture film 17. The leftmost cassette 3 of FIG. 1 is located in a projection position in which the film 17 can be transported past a gate 10 in the housing 1 so that the images of successive film frames are projected onto a screen, not shown. The carriage 2 is advanced by a step when the rewinding of film 17 onto the supply reel SR in the cassette 3 occupying the projection position is completed. The indexing or advancing mechanism for moving the carriage 2 by steps of predetermined length is of known design, and its construction forms no part of the present invention. For example, such advancing or indexing mechanism may comprise a pinion which meshes with a rack at the underside of the carriage 2 and is rotated through a predetermined angle whenever the advancing mechanism is operated. The shaft 14 shown in the left-hand portion of FIG. 1 forms part of the advancing mechanism for the carriage 2.

The bottom wall of each cassette 3 has an opening 3a through which the film 17 can be withdrawn by a conventional film threading or withdrawing mechanism. The leader of such film is then automatically advanced along a predetermined path which is defined in part by a guide 8 in the housing 1. The leader thereby advances into the range of a driven sprocket 9 which forms part of the film transporting mechanism and advances the film past the gate 10 and on toward the core of a takeup reel, not shown. The arrangement is preferably such that the leader of film 17 is automatically attached to the core of the takeup reel which latter is mounted in or on the housing 1. The bottom wall of the carriage 2 has a series of openings 2p each of which should register with the opening 3a in the bottom wall of the nearest cassette 3. The aligning means which insures that an opening 2p invariably registers with the opening 3a of the cassette 3 in projection position forms part of the present invention. Such registry is important because the aforementioned film threading or withdrawing mechanism (which normally includes a friction wheel 30 movable upwardly into engagement with the outermost convolution of film 17 on the supply reel SR in the cassette occupying the projection position and a suitable deflector (not shown) which deflects the leader of film 17 into the aforementioned path) is designed to move through the nearest opening 2p and can pass through the opening 3a of the cassette 3 in projection position only if such opening 3a is in accurate registry with the corresponding opening 2p and with the withdrawing mechanism. The provision of aligning means is necessary because the dimensions (particularly the width) of cassettes 3 often deviate from desired or optimum dimensions so that, when the carriage 2 contains a full set of cassettes, the tolerances of individual cassettes are compounded and are likely to bring about substantial misalignment between the openings 3a and the respective openings 2p of the carriage 2. The advancing mechanism for the carriage 2 is constructed in such a way that one of the openings 2p invariably registers or should register with the friction wheel 30 of the film threading or withdrawing mechanism when the transport of the carriage 2 by a step is completed. Thus, in order to insure that the friction wheel 30 of the film threading or withdrawing mechanism can enter the cassette 3 which occupies the projection position, it is necessary that the opening 3a of the cassette in projection position register with the corresponding opening 2p of the frame 2 because the opening 2p is normally automatically held in registry with the film threading or withdrawing mechanism. However, and as will be explained hereinafter, the aligning means can be designed in such a way that it not only insures accurate registry between the opening 3a of the cassette 3 in projection position and the corresponding opening 2p of the frame 2 but also that the opening 2p is in an optimum position with reference to the film threading mechanism. In FIG. 1, the film threading or withdrawing mechanism is represented only by the friction wheel 30 which can be moved up and down (arrow 31) in order to enter into or to be withdrawn from the cassette 3 which occupies the projection position. The film threading mechanism can be withdrawn from the cassette in projection position as soon as the leader of the film 17 reaches the driven sprocket 9 because the film transporting mechanism then takes over and completes the transport of the leader into engagement with the core of the takeup reel. Furthermore, the film transporting mechanism thereupon advances the film during the projection of images, for example, by means of a conventional claw pull-down.

Each cassette 3 has a pair of locating projections 3b, 3c extending from one of its side walls and a locating recess 3d provided in its other side wall. The projections 3b, 3c of one cassette 3 enter the recess 3d of the adjacent cassette when the cassettes are properly stacked in the carriage 2. The left-hand end wall 2A of the carriage 2 has a recess 2a which can receive the projections 3b, 3c of the nearest cassette 3, and the right-hand end wall 2B of the carriage 2 supports a manually operable first biasing member 6 which is movable axially under and against the action of a helical spring 4 and has a head 5 provided with a pair of projections 5a, 5b extending into the recess 3d of the nearest cassette 3. The spring 4 reacts against the end wall 2B and bears against the head 5 to urge the projections 5a, 5b into the adjacent recess 3d. The outermost portion of the first biasing member 6 has a knurled or milled knob 6a which can be manipulated by hand to withdraw the projections 5a, 5b from the adjacent recess 3d when the operator wishes to replace the cassettes 3 in the carriage 2 with a set of fresh cassettes or to rearrange the sequence of cassettes in the carriage. The projections 5a, 5b are similar to the projections 3b, 3c of the cassettes 3, and the recess 2a in the end wall 2A is similar to the recesses 3d.

It will be readily understood that, when the carriage 2 accommodates a substantial number of cassettes 3 which are stacked or arrayed therein in a manner as shown in FIG. 1, the tolerances in the dimensions of discrete cassettes 3 can be compounded so that the openings 3a in the bottom walls of some or all of the cassettes 3 are likely to be out of register with the corresponding (nearest) opening 2p in the bottom wall of the carriage 2 to such an extent that the film threading or withdrawing mechanism (including the friction wheel 30) is unlikely to be able to enter through the opening 3a in the cassette 3 which occupies the projection position. An appreciable misalignment of openings 2p with the friction wheel 30 of the film threading or withdrawing mechanism is less likely. The projections 3b, 3c and the recesses 3d of the cassettes 3 are preferably disposed substantially or exactly midway between the top and bottom walls of the cassettes. Thus, when the cassettes 3 are arrayed in the carriage 2 in a manner as shown in FIG. 1 (i.e., when the projections 5a, 5b on the head 5 of the first biasing member 6 extend into the recess 3d of the rightmost cassette 3 and the projections 3b, 3c of the leftmost cassette 3 extend into the recess 2a of the end wall 2A), the entire set of cassettes can be tilted to a certain extent by a second biasing member here shown as including one or more leaf springs 7 secured to the inner side of the end wall 2A and bearing against the lower portion of the left-hand side wall of the leftmost cassette 3. Such tilting of cassettes 3 under the action of the spring 7 is made possible because the projections 5 a, 5b and 3b, 3c must extend into the adjacent recesses 3d or 2a with at least some clearance, i.e., because the cassettes 3 have a limited freedom of movement with reference to the carriage 2. Such movements are limited by the first biasing member 6 which urges the cassettes in a direction toward the end wall 2A and by the second biasing member 7 which biases the cassettes in a different direction. The biasing member 7 tends to pivot the cassettes 3 in a counterclockwise direction, as viewed in FIG. 1, about an axis which coincides with or is closely adjacent to and parallel with the axis of the first biasing member 6. Such pivoting of cassettes 3 can result in further misalignment of the openings 3a with the nearest openings 2p or it might, in some instances, reduce the extent of misalignment between the openings 3a and 2p. The extent to which the biasing member 7 can pivot the set of cassettes 3 in a counterclockwise direction is determined by a stop shoulder 2c provided on the bottom wall of the carriage 2 and extending into the path of the lower end portion 7a of the member 7. The lower end portion 7a is received in a cutout 2b in the lower part of the end wall 2A.

The aforementioned aligning means for placing the opening 3a of the cassette 3 occupying the projection position into a predetermined position, i.e., into accurate registry with the nearest opening 2p of the carriage 2 and with the friction wheel 30, comprises a two-armed lever 12 which is pivotable by the shaft 14 of the advancing mechanism for the carriage 2 through the intermediary of a rotary cam 15. The lower arm of the lever 12 has a pin-shaped follower 16 which is biased against the face of the cam 15 by a helical spring 13. The upper arm 12a of the lever 12 has a preferably conical extension 12b which enters the adjacent opening 2p of the carriage 2 (when the latter completes its movement by a step) and the opening 3a of the cassette 3 which has been moved to the projection position. The face of the cam 15 is configurated in such a way that the extension 12b of the upper arm 12a automatically holds the adjacent openings 2p and 3a in a position of exact registry with each other and in requisite alignment with the friction wheel 30 of the film threading or withdrawing mechanism which is then free to enter the opening 3a from below and to start the expulsion of the leader of film 17 into the range of the sprocket 9. The pivot for the shaft 12 is shown at 11; this pivot is mounted in or on the housing 1 of the projector. The extension 12b has an inclined face 12c which abuts against a complementary surface in the cassette 3 occupying the projection position to thereby insure that the opening 3a of such cassette is in exact registry with the corresponding opening 2p of the carriage 2 and with the friction wheel 30. The lever 12 can overcome the bias of the second biasing member 7 by tilting (if necessary) the cassette 3 which occupies the projection position in a clockwise direction in order to insure unimpeded entry of the friction wheel 30 into such cassette and proper threading of the leader of film 17 through the projector.

The cam 15 completes one revolution in response to each actuation of the advancing mechanism for the carriage 2. Such rotation of the cam 15 causes the extension 12b to be withdrawn from the adjacent openings 2p, 3a so as to permit the carriage 2 to advance by a step, and the projection 2b thereupon enters the next openings 2p, 3a to place the next cassette 3 into exact alignment with the friction wheel 30 of the film threading or withdrawing mechanism. The advancing mechanism for the carriage 2 is actuated upon completion of rewinding of film 17 onto the supply reel SR of that cassette 3 which occupies the projection position. It will be seen that the shaft 14 and cam 15 can cause the aligning lever to move between the operative position of FIG. 1 and an inoperative or retracted position in which the carriage 2 is free to move with reference to the housing 1. The carriage 2 can be transported in automatic response to completion of rewinding of film 17, for example, in a manner as disclosed in the copending application Ser. No. 119,518, filed Mar. 1, 1971 by Kremp et al. and entitled "Motion Picture Projector with Magazine for Film-Containing Cassettes."

It is clear that the aligning means of FIG. 1 need not be designed to enter the opening 3a which serves to permit withdrawal and rewinding of film 17. Thus, the bottom wall or another wall of each cassette 3 can be provided with a separate opening, notch or recess which receives the extension 12b of the aligning lever 12 when the transport of the carriage 2 by a step is completed. The construction shown in FIG. 1 is preferred at this time because the cassettes 3 need not be provided with separate recesses, notches or the like for the extension 12b of the aligning lever and also because the likelihood of proper alignment of the openings 3a with the film threading mechanism is greater if the extension 12b extends directly into the opening 3a of the cassette occupying the projection position. All that counts is to insure that the aligning means can change (if necessary) the position of the cassette which is located in the projection position if the actual position of such cassette does not coincide with the desired optimum projection position. It is further clear that the extension 12b of the aligning lever 12 can also change the position of the adjacent opening 2p if such position does not correspond to a desired optimum position. Thus, the carriage 2 can be coupled with the advancing or indexing means with some play so that the extension 12b can adjust the position of the carriage 2 simultaneously with adjustment of the cassette 3 which should occupy the projection position.

The biasing member 7 can be deformed to the extent which is necessary to store in the carriage 2 a predetermined number of cassettes 3 even if the dimensions of each cassette greatly exceed a desired or optimum value, i.e., even if each of the six cassettes shown in FIG. 1 is thicker than an ideal cassette.

FIG. 2 illustrates a portion of a modified motion picture projector having a housing 101 provided with guide means for a reciprocable carriage or frame 18. This carriage accommodates a preferably removable magazine or tray 17 for a set of cassettes 3. The end walls 17A, 17B of the magazine 17 are constructed in a manner as shown for the end walls 2A, 2B of FIG. 1, i.e., they are respectively provided with a recess 2a (not shown) and with a reciprocable first biasing member 6 having a knob 6a and serving to bias the cassettes 3 of the set in a direction toward the end wall 17A. The magazine 17 is movable lengthwise in guide means or ways 18a provided therefor in the carriage 18. The carriage 18 is indexible in the same way as described for the carriage 2, and the housing 101 supports an aligning lever having an extension 12b which is identical with or analogous to the extension 12b of FIG. 1. The purpose of the extension 12b is to insure proper alignment of the opening 3a in the bottom wall of cassette 3 occupying the projection position with the film threading or withdrawing mechanism (not shown in FIG. 2).

The carriage 18 is provided with an arresting lever 20 which is pivotable on a pin 19 and has a stop face or shoulder 20a normally extending into the ways 18a, i.e., into the path of the magazine 17 which is biased against the shoulder 20a by a second biasing member here shown as a leaf spring 22 mounted at the left-hand end of the carriage 18, as viewed in FIG. 2. The arresting lever 20 is biased in a counterclockwise direction, as viewed in FIG. 2, by a torsion spring 21 so that its shoulder 20a is normally located in the path of the surface 17a on the end wall 17B. The extension 12b of the aligning lever 12 can shift the magazine 17 with the set of cassettes 3 therein against the opposition of the leaf spring 22 to such an extent that the opening 3a of the cassette 3 occupying the projection position is in exact registry with the film threading or withdrawing mechanism even if the dimensions of each cassette deviate from the desired or optimum dimensions, i.e., if the extent of misalignment between the opening 3a of the cassette 3 in projection position and the film threading or withdrawing mechanism is the result of utilization of a full set of cassettes the dimensions of each of which deviate from desired dimensions.

When the operator wishes to replace the magazine 17 with a magazine containing a second set of cassettes, the arresting lever 20 is pivoted in a clockwise direction, as viewed in FIG. 2, in response to application of finger pressure against its end portion 20b so that the spring 21 stores energy and the magazine can be withdrawn in a direction to the right. The position of the stop face 20a is selected in such a way that the magazine 17 can store a predetermined number of cassettes 3 even if the dimensions of each cassette deviate to a maximum extent from a predetermined optimum value. The spring 22 then undergoes maximum compression.

An advantage of the projector which is shown in FIG. 2 is that the magazine 17 with cassettes 3 can be detached when the projector is not in use. The housing 101 of the projector (with the carriage 18) then occupies less room when placed into storage or into a carrying case. An advantage of the projector of FIG. 1 is that it need not employ a discrete magazine for the cassettes, i.e., that the cassettes can be placed directly into the carriage 2.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

I claim:

1. In a motion picture projector, a combination comprising a support; a carriage movably mounted on said support; a set of cassettes in said carriage, the cassettes of said set having limited freedom of movement with reference to said carriage along the direction of movement of said carriage, and each thereof containing a supply of convoluted motion picture film and having an opening for withdrawal of film from the respective supply; advancing means for moving said carriage with reference to said support between a plurality of positions in each of which a different cassette of said set occupies a projection position; film withdrawing means mounted in said support and operable to withdraw film from the cassette occupying said projection position; and aligning means mounted in said support and movable between an inoperative position in which said carriage is free to move with reference to said support and an operative position of engagement with the cassette occupying said projection position to maintain the opening of such cassette in a predetermined position with reference to said withdrawing means.

2. A combination as defined in claim 1, further comprising biasing means for the set of cassettes in said carriage, said aligning means being arranged to move the cassette occupying said projection position against the opposition of said biasing means when the position of the opening of the cassette occupying said projection position deviates from said predetermined position with reference to said withdrawing means.

3. A combination as defined in claim 1, wherein the cassettes of said set abut against each other and each cassette comprises a bottom wall which is provided with the respective opening.

4. A combination as defined in claim 1, wherein said aligning means comprises a conical portion which engages the cassette occupying said projection position in the operative position of said aligning means.

5. A combination as defined in claim 1, wherein said aligning means comprises an inclined surface which engages the cassette occupying said projection position in the operative position of said aligning means.

6. A combination as defined in claim 1, wherein said aligning means comprises an extension which extends into the opening of the cassette occupying said projection position in the operative position of said aligning means, said extension being withdrawn from such opening when the carriage is being moved by said advancing means.

7. A combination as defined in claim 1, further comprising first biasing means for biasing the cassettes of said set in a first direction with reference to said carriage and second biasing means for biasing the cassettes of said set in a second direction with reference to said carriage, said aligning means being arranged to move the cassette occupying said projection position against the opposition of at least one of said biasing means when the position of the opening in the cassette occupying such projection position deviates from said predetermined position with reference to said withdrawing means.

8. A combination as defined in claim 7, wherein said set includes a pair of outermost cassettes and wherein each of said cassettes has a median portion remote from the respective opening and a second portion nearer to the respective opening, said first biasing means engaging the median portion of one of said outermost cassettes and said second biasing means engaging the second portion of the other outermost cassette.

9. A combination as defined in claim 7, further comprising stop means for limiting the extent of movement of cassettes with reference to said carriage under the action of said second biasing means.

10. A combination as defined in claim 9, wherein said second biasing means comprises at least one leaf spring secured to said carriage.

11. A combination as defined in claim 1, further comprising a magazine for said set of cassettes, said magazine being movably mounted in and having said limited freedom of movement with reference to said carriage.

12. A combination as defined in claim 11, wherein said magazine is detachable from said carriage.

13. A combination as defined in claim 11, further comprising biasing means provided on said carriage for biasing said magazine in a predetermined direction, and stop means provided on said carriage for limiting the extent of movement of said magazine in said predetermined direction, said aligning means being arranged to move the cassette occupying said projection position against the opposition of said biasing means when the position of the opening in the cassette occupying said projection position deviates from said predetermined position with reference to said withdrawing means.

14. A combination as defined in claim 13, wherein said stop means is movable to a retracted position in which it permits detachment of said magazine from said carriage.

15. A combination as defined in claim 1, wherein said advancing means comprises means for moving said aligning means between said operative and inoperative positions.

16. A combination as defined in claim 15, wherein said advancing means comprises a rotary shaft and said aligning means comprises a lever pivotable about a predetermined axis, said means for moving said aligning means comprising a cam provided on said shaft and a follower provided on said lever and biased against said cam.

* * * * *